Patented Apr. 28, 1936

2,038,556

UNITED STATES PATENT OFFICE 2,038,556

LIQUID COMPOSITION CONTAINING RUBBER

Carleton Ellis, Montclair, N. J., assignor to Standard Oil Development Company, a corporation of Delaware No Drawing. Application December 24, 1932, Serial No. 648,825

5 Claims. (Cl. 134—17)

The present invention relates to improved solvent compositions and more specifically to compositions which are used as rubber cements.

In the making of such compositions the crepe rubber, or other forms of crude rubber, or other rubber stock is dissolved in a hydrocarbon mixture of the character more fully described below. This hydrocarbon solvent preferably possesses a higher boiling range and higher flash point than benzol (customarily used as a rubber solvent) and furthermore does not exhibit those peculiar toxic properties commonly attributed to benzol. In addition the preferred solvent also exhibits the following unusual property, namely, that over a considerable range of viscosity, solutions of rubber therein show a higher rubber content than do solutions of the same viscosity but which are made with benzol.

This unusual property of the hydroformed solvents is of particular importance in the manufacture of rubber cements, as it allows more of the cementing material to be employed per given volume of solvent, thus aiding in the cementing operation. At the same time the viscosity of the solution is not increased, and an even flow or distribution of the cementing composition may be secured.

The preferred solvent is a synthetic hydroformed vehicle, derived from petroleum or its various liquid distillation or extraction products. These hydroformed solvents may be produced from petroleum distillates such as burning oil or gas oil, and in general from hydrocarbon oils of a boiling range including that of gasoline and also of ranges extending up to about 650° to 700° F. or somewhat higher. In producing such solvents a petroleum distillate oil may be passed in the vapor phase with free hydrogen over a suitable catalyst at a pressure in excess of 20 atmospheres (preferably 50 to 200 atmospheres or higher) desirably at a temperature above 900° F. and preferably within the range of about 930° to 1050° F. with a suitable partial pressure of hydrogen and time of contact to secure reconstituting of the hydrocarbon oil molecules without necessarily forming appreciable amounts of polymerized or coky material. The hydrogen supplied is preferably within the range of about 1000 to 4000 cubic feet per barrel of feed oil, the amount generally depending upon the gravity and boiling range of the charging stock. A greater proportion of hydrogen may be used with suitable variation in feed rate, temperature and pressure. The feed rate depends upon the reaction temperature, and other operating conditions such as the partial pressure of hydrogen. This rate may be suitably about 1.5 to 4 volumes of oil per volume of catalyst-filled reaction space per hour.

The catalysts preferably comprise the oxides or sulphides of the elements of the 6th group together with suitable promoters of the alkaline earth or earth oxides. Such catalysts are insensitive to sulphur poisoning and are suitably classified as sulphactive.

The hydroformed petroleum product obtained thereby possesses highly desirable solvent powers throughout its boiling range. For my particular purpose, however, I prefer to use fractions possessing adequate volatility, for example, boiling in a range which lies within points included between the temperatures 200° and 420° F., though fractions having an initial boiling point of less than 200° F. or higher than 420° F. are not excluded. The requirements of the user respecting the desired rate of drying of a rubber cement may be decisive in the determination of boiling range, a lower boiling range being selected when a higher rate of volatility is needed.

In making solutions of rubber in these hydroformed solvents, a preferred procedure is to masticate the crepe or other crude rubber on milling rolls, and then kneading with the solvent. Or the crude rubber, after masticating, may be placed in contact with the solvent and either allowed to stand or the mixture of rubber and solvent agitated until solution takes place. Considerable time is required to secure solution when the crude rubber is merely allowed to stand in contact with the solvent, while the time is very materially shortened by either agitation or kneading.

By way of illustrating the peculiar solvent power of these hydroformed solvents towards rubber the following examples are given:

Three hydroformed solvents were used; hydro-solvent (1), having a boiling range of 200° to 275° F.; hydro-solvent (2), having a boiling range of 275° to 365° F.; and hydro-solvent (3), having a boiling range of 365° to 419° F. For comparative purposes the results obtained when using benzene (benzol) and an ordinary petroleum "solvent" naphtha (boiling range 197° to 270° F.) not subjected to the hydrogen treatment, are included also. The rubber was smoked sheet, milled to run smooth on the rolls. Stock solutions were prepared by placing 7.5 grams of rubber in 150 cc. of the solvent and the mixture shaken until complete solution took place. Solutions of lower concentrations of rubber (within dilution of commercial significance) were prepared by diluting the original solutions with the requisite quantity of additional solvent. The following table gives the Saybolt viscosity at 100° F. for the diluted solutions so prepared.

| Solvent | Grams of rubber per 100 cc. | Viscosity at 100° F. in Saybolt seconds |
| --- | --- | --- |
| Benzene (benzol) | 2.5<br>1.67 | 255<br>132 |
| Hydro-solvent (1) | 2.5<br>1.67 | 80<br>49 |
| Hydro-solvent (2) | 2.5<br>1.67 | 104<br>59 |
| Hydro-solvent (3) | 2.5<br>1.67 | 115.5<br>66.5 |
| Ordinary petroleum "solvent" naphtha. No hydrogen treatment | 2.5 | 466 |

It will be readily seen from the above data that, within a range of useful concentrations, solutions of rubber in the hydroformed solvents are much less viscous than benzol solutions of the same rubber content and very much less viscous than petroleum solvent naphtha solutions of the same rubber content. Another way of stating this is that for solutions of the same viscosity more rubber may be dissolved in the hydroformed solvents than in either benzol or petroleum solvent naphtha. For example: the concentration of rubber required in benzol for a 200 second viscosity solution can be calculated at about 2 grams per 100 cc., while for hydroformed solvent (1) over 3 grams per 100 cc. are required. For the same viscosity relatively much less rubber is present in the case of the ordinary petroleum solvent naphtha. Within useful concentrations, therefore, volatile hydroformed petroleum solvents provide the means of applying a greater weight of rubber with less solvent.

In consequence excellent rubber-containing compositions may be made which may be utilized as rubber cement in the shoe industry and elsewhere, as coating compositions to produce rubberized fabrics, waterproof material, and the like, and for various other purposes. The rubber solutions in hydroformed solvents may also be used for the preparation of dipped goods. The main requirement for such a purpose is the use of a solvent having a uniform evaporation rate, a non-objectionable odor, and a satisfactory capacity to dissolve rubber. The hydroformed solvents possess such properties to a noteworthy degree. To such compositions there may be added resins, animal, vegetable or mineral oils, as well as other modifying agent, including pigments, fillers, sulphur and other vulcanizing agent, accelerators of vulcanization, anti-oxidants, and the like. In some cases other solvents may be incorporated with the hydroformed vehicle, including ordinary petroleum naphthas, volatile coal tar solvents, and so forth. However, for most purposes it is desirable to use as the sole solvent the hydroformed vehicle for hygienic reasons as well as because of its pleasant odor. Additions of solvents such as certain of those derived from coal tar, likewise hydrogenated naphthalene such as tetralin, tend to give the composition an unpleasant odor which would be objectionable to workmen, especially in confined places.

While I have referred principally to crepe rubber and other forms of raw rubber, it is understood that I may employ in some cases rubber which has been slightly vulcanized so that its solubility is not particularly reduced, also some forms of reclaimed rubber and various other members of the rubber family, including balata, and the like, in so far as their solubility permits such use. Mixtures of various rubber materials may be used in other cases. The product known as depolymerized rubber, which is rubber that has been treated with acid or other substance to reduce its degree of polymerization and increase its solubility, may be employed in solution in the hydroformed vehicle, with or without other rubber stocks.

My invention is not to be limited by any of the above examples given for illustrative purposes nor by any theory regarding the solvent characteristics of the hydroformed solvents.

What I claim is:

1. A rubber composition comprising rubber in solution in a solvent produced by destructive hydrogenation of a petroleum distillate having a boiling range including that of gasoline, burning oil and gas oil and extending up to about 700° F., at a temperature above about 900° F. and a pressure in excess of 20 atmospheres in the presence of a hydrogenation catalyst.

2. Composition according to claim 1 in which the solvent boils in a range between the approximate limits of 200° and 420° F.

3. Composition according to claim 1 in which the solvent boils in a range between the approximate limits of 200° and 275° F.

4. Composition according to claim 1 having a 100° F. Saybolt viscosity between the approximate limits of 50 and 200 seconds.

5. Composition according to claim 1 in which the solvent used has a viscosity corresponding to substantially less than 250 seconds Saybolt at 100° F. for 2.5 grams of smoked sheet rubber, milled to run smooth on the rolls, per 100 cc. of solution and substantially less than 130 seconds Saybolt at 100° F. for a concentration of 1.67 grams of the same smoked sheet rubber per 100 cc. of solution.

CARLETON ELLIS.